(12) United States Patent
Hanna

(10) Patent No.: US 8,745,981 B1
(45) Date of Patent: Jun. 10, 2014

(54) OCEAN POWERED TAKE-OFF FOR MULTIPLE ROTARY DRIVES

(71) Applicant: John Clark Hanna, Coquille, OR (US)

(72) Inventor: John Clark Hanna, Coquille, OR (US)

( * ) Notice: Subject to any disclaimer, the term of this patent is extended or adjusted under 35 U.S.C. 154(b) by 0 days.

(21) Appl. No.: 14/050,607

(22) Filed: Oct. 10, 2013

(51) Int. Cl.
F03B 13/18 (2006.01)

(52) U.S. Cl.
USPC .............................. 60/398; 60/507

(58) Field of Classification Search
USPC .................. 60/398, 507; 290/42, 53; 417/337
See application file for complete search history.

(56) References Cited

U.S. PATENT DOCUMENTS

| | | | | |
|---|---|---|---|---|
| 1,925,742 A * | 9/1933 | Bamber et al. | ............... | 60/505 |
| 4,221,538 A * | 9/1980 | Wells | ............... | 415/7 |
| 4,282,442 A * | 8/1981 | Massinger | ............... | 290/1 C |
| 4,319,454 A * | 3/1982 | Lucia | ............... | 60/506 |
| 4,405,866 A * | 9/1983 | Masuda et al. | ............... | 290/53 |
| 4,472,937 A * | 9/1984 | Isamu | ............... | 60/507 |
| 4,541,242 A * | 9/1985 | Thompson, Jr. | ............... | 60/506 |
| 4,612,768 A * | 9/1986 | Thompson, Jr. | ............... | 60/506 |
| 4,718,231 A * | 1/1988 | Vides | ............... | 60/398 |
| 5,186,822 A * | 2/1993 | Tzong et al. | ............... | 60/398 |
| 5,191,225 A * | 3/1993 | Wells | ............... | 290/53 |
| 6,247,308 B1 * | 6/2001 | Solell | ............... | 60/495 |
| 7,877,994 B2 * | 2/2011 | Bull et al. | ............... | 60/495 |
| 8,129,852 B2 * | 3/2012 | Edwards et al. | ............... | 290/44 |
| 8,358,026 B2 * | 1/2013 | Hanna | ............... | 290/54 |
| 8,508,063 B2 * | 8/2013 | Rhinefrank et al. | ............... | 290/53 |
| 2004/0031265 A1 * | 2/2004 | Doleh et al. | ............... | 60/398 |
| 2007/0130929 A1 * | 6/2007 | Khan et al. | ............... | 60/398 |
| 2008/0016863 A1 * | 1/2008 | Tai et al. | ............... | 60/497 |

* cited by examiner

*Primary Examiner* — Michael Leslie

(57) ABSTRACT

A dual powered take-off (PTO) device that efficiently extracts the kinetic energy stored in oceanic waves by converting the up and down movement of passing waves into a linear, bi-directional movement. The prime mover is a float which converts its movement in two ways: (1) by utilization of a direct drive, mechanical one-way rotary force with which to drive ancillary, sub-system devices such as electrical generators and/or pumps and, (2) by utilization of a reciprocating air flow that results as a by-product of the float's movement and, this air flow is exploited to spin one or more self-rectifying turbine(s) to drive electrical generators and/or pumps.

1 Claim, 5 Drawing Sheets

Figure 1:
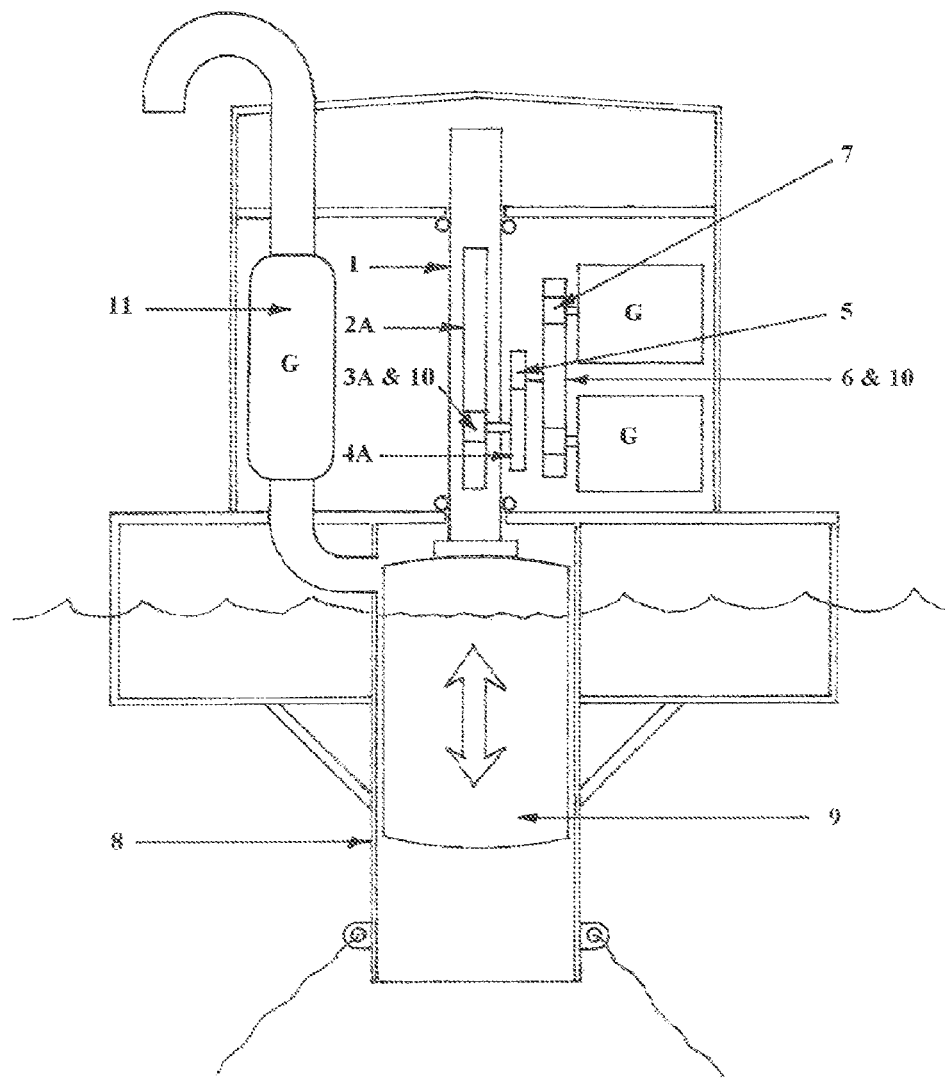

Ocean Powered Take-off for Multiple Rotary Drives

Ocean Powered Take-off for Multiple Rotary Drives

VIEW A-A

Ocean Powered Take-off for Multiple Rotary Drives

VIEW B-B

OCEAN POWERED TAKE-OFF FOR MULTIPLE ROTARY DRIVES

This application is related to and claims benefit of priority by U.S. provisional patent application No. 61/849,618 filed on Jan. 31, 2013. The content of that application is hereby incorporated in its entirety by reference.

BACKGROUND OF THE INVENTION

The present invention combines two separate wave energy capture systems. One system captures wave energy through a direct drive apparatus. As such, numerous prior art and state of the technology devices have been described that will mechanically convert the surge (horizontal motion) and heave (up and down motion) to drive generators or pumps.

The present invention expands upon a prior art wave energy converter (WEC) as described in the now expired U.S. Pat. No. 4,541,242. One aspect of this prior art device describes a rack and pinion arrangement to provide one-way rotational movement to a secondary gear train. In this present invention, the prior art rack and pinion is modified and improved upon. A further discussion regarding the improved design is in the Preferred Embodiment Description section.

Another direct drive wave energy converter is a deep water buoy called the PowerBuoy™ designed by Ocean Power Technologies (OPT) of Pennington, N.J., USA. The OPT buoy converts the reciprocating movement of waves by moving a plunger to drive generators. The plunger is inserted through the top of a semi-submersed, hollow spar enclosure which houses multiple generators that are sealed within the spar's watertight structure.

Another WEC device is called the SeaRAY™ designed by Columbia Power Technologies of Charlottesville, Va., U.S.A. It too is a deep water, direct drive point absorber which uses the surge and heave of waves to turn rotary shafts to drive generators or pumps. Both technologies have their generators sealed within water tight enclosures. Leakage from seals or valves could disable the on board electrics of both designs. The present invention addresses this concern and is discussed in the Preferred Embodiment Description section.

The present invention also captures wave energy through a second means. As a result of the float's cyclical rise and fall within the WEC's enclosure, air is entrained and compressed when the float rises. The compressed air is directed through a duct that drives a self-rectifying turbine. The special unidirectional turbine operates within the bi-directional air stream that is common to all Oscillating Water Column (OWC) systems. As the float falls, atmospheric air is drawn back through the turbine and into the WEC's float enclosure. The turbine provides a unidirectional rotary force to drive one or more electrical generators and/or pumps.

BRIEF DESCRIPTION OF THE INVENTION

The present invention combines two means of driving generators and/or pumps. One method borrows from the standard rack and pinion concept. However, this direct drive mechanism departs from the common design by utilizing two separate racks that independently turn two modified pinions which have sprag-type, freewheeling clutches within their respective hubs.

The prime mover is a buoyant float assembly that is placed within a cylindrical enclosure. The enclosure is a structure that is semi-submerged in the ocean and placed in a vertical position so the uppermost portion of the enclosure is above the regional high water level. This enclosure has underwater openings which allow sea water to freely enter, thus allowing the free surface of water within the enclosure to rise and fall as waves pass by. As a result, the internal float will move up and down within the fixed enclosure. The float is the only part of the power train that is immersed in water.

Affixed to the top of the oscillating float, is a vertical main shaft. The extended shaft penetrates through an opening in the structure's elevated main deck. The shaft moves up and down vertically inside an electrical compartment that is protected from the elements. Affixed to the bi-directional main shaft are dual linear gear tracks or racks. Circular gears or pinions are meshed with the reciprocating racks and additional circular gears are serially engaged in such a manner as to convert the linear movement into a rotary force used to spin generators and/or pumps in one direction only. The following is a narrative on how this one-way rotational force is achieved.

BRIEF DESCRIPTION OF THE FIVE VIEWS OF THE DRAWINGS

FIG. 1/5: This illustrates a cutaway elevation view of an offshore buoy structure where the reciprocating movement of waves is mechanically converted into a rotational force to drive generators, air pumps, hydraulic pumps or sea water pumps. The sketch also shows how compressed exhaust air can be utilized to spin one or more turbine/generators to maximize energy harvesting.

Figure 2:
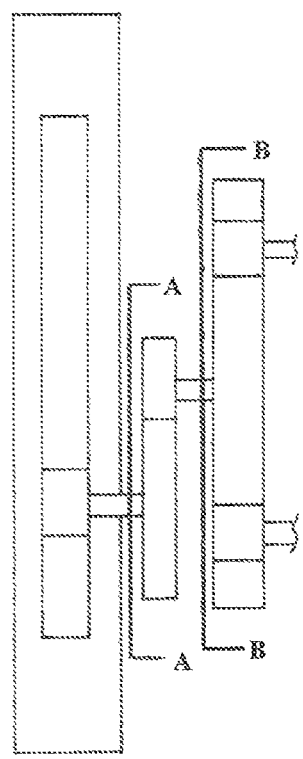

FIG. 2/5: This is a side view sketch which illustrates the positioning of the invention's many gears. Cut lines "A-A" and "B-B" are drawn through two planes to allow a clear interpretation of the layered placement of gears that are shown in subsequent figures.

Figure 3:
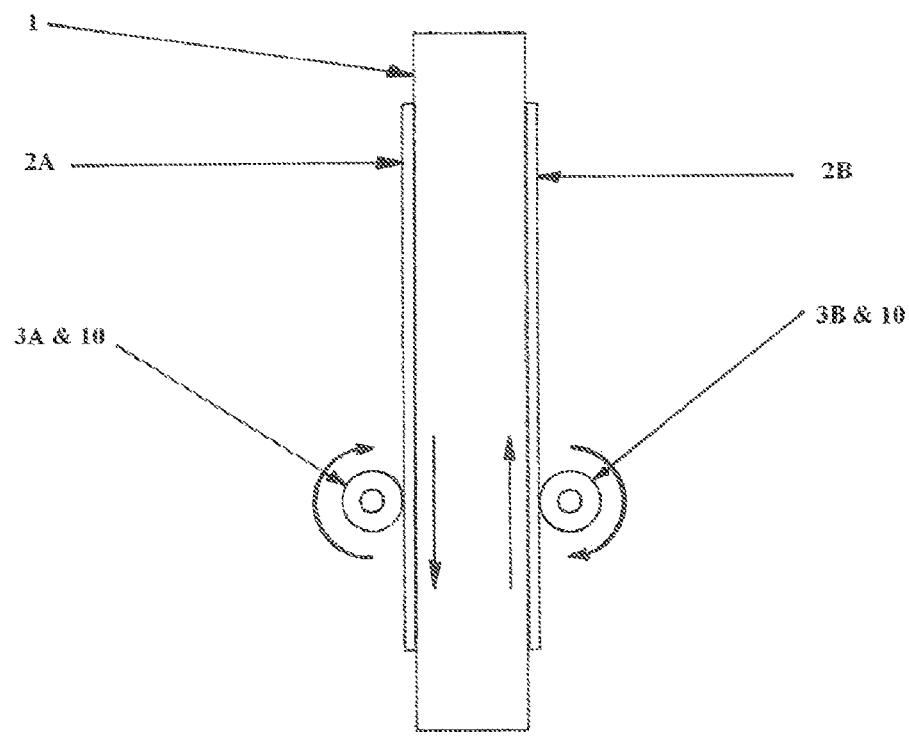

FIG. 3/5: This sketch highlights the bi-directional Main Shaft (1), which is affixed to the Float (9). The Float is not shown for reasons of clarity. Mounted on opposing sides of the Main Shaft are linear gears or Racks, (2-A) and (2-B). Two Pinion or Half-Stroke Clutch Gears, designated (3-A) and (3-B) respectively, are rotary gears which have sprag-type, one-way clutches (10) in each hub. The inner race of the clutches are keyed to the gears' respective axles which extend outwards to drive larger diameter gears keyed to the ends of the Pinion Drive axles. The arrows indicate the direction of movement for each component.

Figure 4:
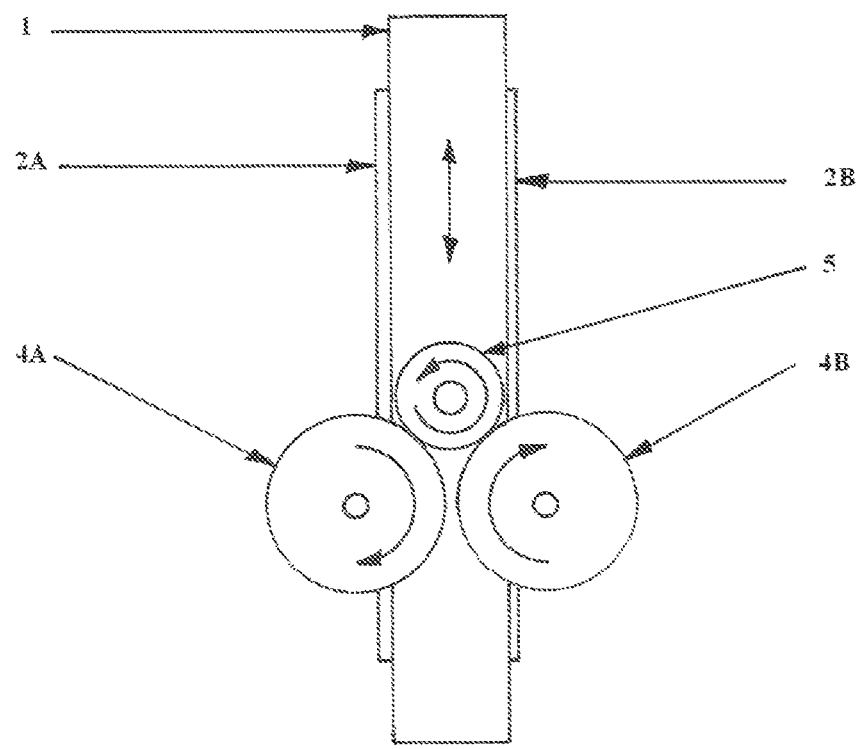

FIG. 4/5: This sketch highlights the view as seen from the vantage of cut line "A-A" shown in FIG. 2/5. Here is shown the larger diameter Half-Stroke Drive Gears (4-A) and (4-B) which are keyed to the ends of the axles for the Half-Stroke Clutch Gears (3-A) and (3-B). Between the Half-Stroke Drive Gears (4-A) and (4-B) is the smaller diameter One-Way Drive Gear (5) which is keyed to an axle that extends outward. The arrows indicate the direction of movement of each component.

Figure 5:
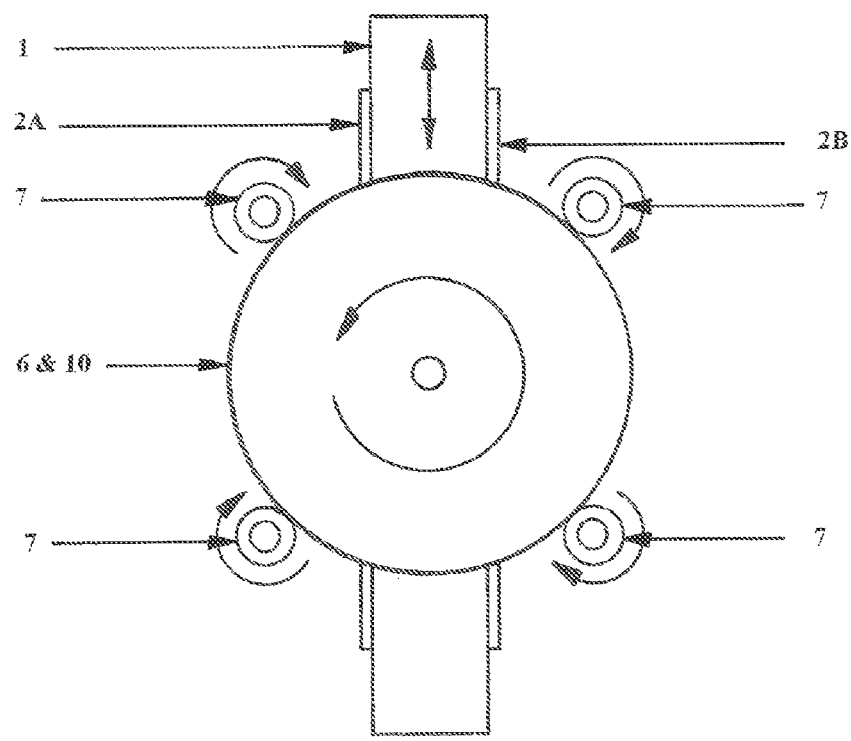

FIG. 5/5: This sketch highlights the view as seen from the vantage of cut line "B-B" shown in FIG. 2/5. Here is shown the large diameter Flywheel Clutch Gear (6) which has a sprag-type, one-way clutch in its hub. The inner race of the clutch is keyed to the axle that extends outward from the One-Way Drive Gear (5). The gear teeth on the outer edge of the Flywheel Clutch Gear are meshed with four small diameter Generator or Pump Drive Gears (7). The Flywheel (6) can also be modified to serve as a Rotor for a stand-alone Generator-Flywheel configuration. The arrows indicate the direction of movement for each component.

| Component Nomenclature: | |
|---|---|
| (1): | Main Shaft |
| (2-A, B): | Rack Gears |
| (3-A, B): | Half-Stroke Clutch Gears (Pinions) |
| (4-A, B): | Half-Stroke Drive Gears |
| (5): | One-Way Drive Gear |
| (6): | Flywheel Clutch Gear |
| (7): | Generator/Pump Drives |
| (8): | Enclosure |
| (9): | Float |
| (10): | One-Way Clutch |
| (11): | OWC/OAC Turbine |

BRIEF SUMMARY OF THE INVENTION

As oceanic waves pass by a hollow Enclosure (8) that has openings below the regional low water level, a buoyant Float (9) is free to rise and fall within the confines of the Enclosure. Affixed to the top of the Float is a Main Shaft (1) that penetrates through the top of the Enclosure as it rises and falls with the buoyant Float.

Affixed to opposing sides of the Main Shaft, are Rack Gears (2-A and 2-B) that have machined gear teeth that run between the limits of the Main Shaft's (1) stroke length which is determined by maximum high and low tide calculations. Adjacent to the two opposing Rack Gears are two Half-Stroke Clutch Gears (3-A and 3-B) whose teeth mesh with the Rack Gears (2-A and 2B). As the Rack Gears move up and down by wave action, the Half-Stroke Clutch Gears are turned. However, the Half-Stroke Clutch Gears do not alternate between clockwise and counter-clockwise rotations as the Main Shaft rises and falls. This is due to the fact that within the hub of each of the two Half-Stroke Clutch Gears, there are sprag-type, One-Way Clutches (10). These One-Way Clutches allow the Half-Stoke Clutch Gears to engage the Rack Gears in only one direction of travel.

When the Rack Gear (2-B) moves upward with a passing wave, the Half-Stroke Clutch Gear (3-B) is engaged to turn in a in clockwise direction while the Half-Stroke Clutch Gear (3-A) remains disengaged in a freewheel condition. Thus, when the Rack reverses direction and moves downward with the falling wave cycle, the Half-Stroke Clutch Gear (3-A) is then activated to turn in a clockwise direction while Half-Stroke Clutch Gear (3-B) now becomes disengaged in the freewheel condition.

The axles that are inserted through both Half-Stroke Clutch Gears (3-A and 3-B) are keyed directly to the inner races of each One-Way Clutch (10). Therefore, the two axles will only be able to rotate alternately in a clockwise direction when either of the corresponding Half-Stroke Clutch Gears are in an engaged condition. The axles will never rotate in a counter-clockwise direction.

The axles for the two Half-Stroke Clutch Gears (3-A and 3-B) are extended outward and are keyed directly to their respective Half-Stroke Drive Gears (4-A and 4-B). These have a larger diameter than the Half-Stroke Clutch Gears. Both gears will turn alternately in a clockwise direction only Positioned between the two Half-Stroke Drive Gears (4-A and 4-B) is the One-Way Drive Gear (5). This gear has a smaller diameter than the two adjacent Half-Stroke Drive Gears and the teeth of all three gears are meshed together. When either one of the two Half-Stroke Drive Gears is in a clockwise drive mode, it will cause the One-Way Drive gear to rotate in a counter-clockwise direction. The alternating sequence of the Half-Stoke Drive Gears causes the One-Way Drive Gear to turn continuously in only a counter-clockwise direction at all times.

In the one-way drive train, one end of an axle is keyed directly to the One-Way Drive Gear (5). This axle extends outward and is keyed directly to the inner race of a One-Way Clutch (10) on the axle's other end. This One-Way Clutch is in the hub of Flywheel Clutch Gear (6). The Flywheel Clutch Gear has a large diameter and its spinning mass provides a smooth, continuous application of angular momentum in a counter-clockwise direction at all times. The outer periphery of the large Flywheel Clutch Gear has teeth that are meant to mesh with the teeth on small diameter Generator or Pump Drives (7). A plurality of Generator and/or Pump Drives will rotate continuously in a clockwise direction, at all times, as long as there is a suitable wave climate to cause the Float (9) to rise and fall within the Enclosure (8). Air that is trapped between the top of the Float (9) and the top of the Enclosure (8) as the Float rises, is directed through one or more special self-rectifying Turbines (11) to provide a second means of rotary power to drive generators or pumps.

DESCRIPTION OF THE PREFERRED EMBODIMENT

The configuration of a buoy platform is but one of several proposed applications for this invention. Two of the other designs mentioned previously in the Background narrative (PowerBuoy™ and SeaRAY™), are not as versatile as the present invention since they are exclusively off shore designs. The other designs must address challenging logistics to transport the structures to shore for critical repairs of their sealed electrical components. With the present invention, all power generating equipment would be fully accessible at sea.

Therefore, the preferred embodiment of the invention would have the mechanism incorporated into a near shore breakwater or onshore structure such as a jetty, sea wall, dock or pier. It can also be placed in a cliff-side excavation. Both the off shore and onshore embodiments of the present invention, have the benefit of being directly accessible for easy, direct, less costly maintenance and repairs on the electrical components. Electric generator and power conditioning equipment would be housed in an accessible, dry environment. A near shore or onshore placement would allow the prime mover (Float) to harvest greater amounts of energy from the amplified wave profiles found closer to shore. Other practical applications for the present invention could have the conversion mechanism incorporated into the legs of offshore drilling rigs or floating wind and wave energy platforms.

In all applications, whether they are onshore structures or off shore buoys or platforms, the energy produced by the mechanical PTO drive could be enhanced with the addition of one or more Hanna Turbines (U.S. Pat. No. 8,358,026). Other types of self-rectifying turbines such as an impulse turbine or a Wells-type turbine, could be substituted for the Hanna Turbine. The turbine(s) would be driven by compressed air created when water levels peak inside the Enclosure, causing the Float to rise. This compressed air flow is commonly referred to as an Oscillating Water/Air Column (OWC/OAC). The turbine(s) would provide an auxiliary source of power for the grid or to service onboard electrical functions.

When the direct drive aspect of the design employs multiple generators or pumps, mechanical stresses can be reduced during start up with the use of centrifugal clutches to smoothly apply torque to the generators' drive shafts. Once the device is in motion, the self-feathering, freewheeling nature of the Flywheel Clutch Gear will contribute to a reduction of stress on the geared drive train whenever intermittent wave periods occur. This is an improvement over the prior art rack and pinion mechanism described in the expired U.S. Pat. No. 4,541,242. This improved configuration drives a unidirectional flywheel/generator assembly that has a freewheeling clutch in its hub. The clutch allows the flywheel to coast and continue generating electricity under its own momentum even when there is a delay between incident wave cycles. Frictional loss is minimized because the gears have only four points of contact. There are a minimum of six bearings in the design. The bearings and freewheel clutches will be off-the-shelf items. Weight will be reduced by using a structural aluminum Rack assembly and other components made of durable plastic and polymer composites. Structural framing members will be made of reinforced concrete. If an off shore application is chosen for the present invention, the entire buoy structure will be built using a cost-effective, modular concrete design to mitigate corrosion and assure a service life that will last for decades.

When the design employs the stand-alone flywheel/generator configuration (rather than using multiple independent generators), the present invention will use a new, low speed, direct drive, permanent magnet topology developed by engineers at Scotland's Edinburgh University. It was designed specifically for WEC devices to operate with high efficiency under variable speeds. The generator eliminates the excessively large magnetic attraction forces common to conventional iron-cored topologies.

It is claimed:

1. An ocean powered energy conversion device comprising: two ocean powered mechanisms which are contained within a single structure for converting the rise and fall of oceanic waves to develop a mechanical, one-way rotary force for the purpose of performing useful work, the prime mover for both mechanisms is a buoyant float which is contained within the single structure, the single structure having a vertical hollow column including a submerged open end at the column base for allowing sea water to enter, a free surface of water entrained within the column rises and falls in relation to passing oceanic waves causing the float to rise and fall within the hollow column, the reciprocating linear action of the float is converted to develop a one-way rotary force in two distinct ways, wherein, a first mechanism comprises a mechanical, direct drive connection having a main shaft coupled to the top of the float at one end, the main shaft including two vertical, rectilinear rack gears that mesh with two opposing pinion gears, the pinion gears including one-way clutch bearings in respective hubs allowing only one pinion to be engaged and turned as the rack moves upward while the opposing pinion will freewheel and, when the rack moves downward, the opposing pinion will be engaged and the other will freewheel, and a third gear, which is configured to be driven by the two pinions, turns continually in one direction only, is connected to a flywheel by a one-way drive shaft, the flywheel including a one-way clutch that allows the flywheel to disengage from the one-way drive shaft and continue spinning in a prolonged manner under its own momentum whenever the drive shaft revolutions become less than that of the spinning flywheel, the flywheel providing a mechanical rotational force to drive generators or other rotating machinery in a first way, and wherein, a second mechanism, which operates simultaneously with the first mechanism whenever the float rises inside the hollow column comprises air trapped between the upper surface of the float and a solid top of the column, when the float rises the pressurized air is bled off through a duct which directs the exhaust air through a self-rectifying turbine which spins in only one direction and which continues to spin in the same direction even when the air stream reverses as the float falls and atmospheric air is drawn back into the hollow column in a cyclical fashion resulting in the development of a second one-way rotary force to mechanically drive generators or other rotating machinery in a second way.

* * * * *